US006763321B2

(12) United States Patent
Gross et al.

(10) Patent No.: US 6,763,321 B2
(45) Date of Patent: Jul. 13, 2004

(54) METHOD AND APPARATUS TO FACILITATE MEASUREMENT OF QUALITY-OF-SERVICE PERFORMANCE OF A NETWORK SERVER

(75) Inventors: Kenny C. Gross, San Diego, CA (US); David M. Fishman, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 144 days.

(21) Appl. No.: 09/887,944

(22) Filed: Jun. 22, 2001

(65) Prior Publication Data

US 2002/0198684 A1 Dec. 26, 2002

(51) Int. Cl.$^7$ .............................................. G06F 11/30
(52) U.S. Cl. ...................................... 702/186; 709/224
(58) Field of Search ................................ 702/182, 176, 702/186–188; 709/223, 224, 218, 219, 203, 207

(56) References Cited

U.S. PATENT DOCUMENTS

| 5,303,166 | A | * | 4/1994 | Amalfitano et al. ......... 702/186 |
| 5,434,848 | A | * | 7/1995 | Chimento et al. .......... 370/232 |
| 5,812,780 | A | * | 9/1998 | Chen et al. .................. 709/224 |
| 5,819,066 | A | * | 10/1998 | Bromberg et al. .......... 707/102 |
| 6,138,157 | A | * | 10/2000 | Welter et al. ................ 709/224 |
| 6,157,940 | A | * | 12/2000 | Marullo et al. ............... 703/27 |
| 6,167,534 | A | * | 12/2000 | Straathof et al. ............. 714/38 |
| 6,317,787 | B1 | * | 11/2001 | Boyd et al. .................. 709/224 |
| 6,324,492 | B1 | * | 11/2001 | Rowe ........................... 703/13 |
| 6,360,332 | B1 | * | 3/2002 | Weinberg et al. ............. 714/4 |
| 6,477,483 | B1 | * | 11/2002 | Scarlat et al. ............... 702/186 |
| 6,519,714 | B1 | * | 2/2003 | Sweet et al. .................. 714/28 |

OTHER PUBLICATIONS

Michael D. Beynon et al., Performance Evaluation of Client–Server Architectures for Large–Scale Image–Processing Applications. Published Dec. 1998.*
*Publication*, entitled "Sinusoidal Source Perturbation Experiments with a Breached Fuel Subassembly in the Experimental Breeder Reactor II," to K.C. Gross and R.V. Strain, Nuclear Technology, vol. 98, pp 113–123, Apr. 1992.

* cited by examiner

*Primary Examiner*—Marc S. Huff
*Assistant Examiner*—Craig Steven Miller
(74) *Attorney, Agent, or Firm*—Park, Vaughan & Fleming LLP

(57) ABSTRACT

One embodiment of the present invention provides a system that facilitates measuring quality-of-service of a computer network server or collection of servers by determining the effect that transactions in one category of service have on transactions in other categories of service. The system operates by generating a varying pattern of synthetic transactions for one category of service and a fixed pattern of synthetic transactions for the other categories of service. The system sends the varying pattern and the fixed pattern of synthetic transactions and receives responses to these patterns across a network between the computer network servers and the synthetic transaction generator. The system measures the response time for the varying pattern of synthetic transactions and the response time for the fixed pattern of synthetic transactions. Additionally, the system calculates the effect of transactions in one category of service on response times in the other category of service.

27 Claims, 3 Drawing Sheets

METHOD AND APPARATUS TO FACILITATE MEASUREMENT OF QUALITY-OF-SERVICE PERFORMANCE OF A NETWORK SERVER

BACKGROUND

1. Field of the Invention

The present invention relates to computer network servers. More specifically, the present invention relates to a method and an apparatus that facilitates measuring quality-of-service performance of a network server or collection of servers.

2. Related Art

Application availability is widely sought after as a requirement for applications delivered over networks. While users know what they want—continuous application access with predictable performance—it is often difficult to establish concrete measures that show whether the service providers charged with delivering the application over the network can meet these requirements. In an effort to quantify the availability of an application, system operators have established metrics that evaluate the end-to-end service response of an application delivered over a network.

In its classic form, availability is represented as a fraction of total time that a service needs to be available to perform its intended function. From a theoretical perspective, the asymptotic availability can be quantified as the ratio of the mean time between failures or interruptions (MTBF or MTBI) to the sum of the MTBF and the failure recovery time (also known as the MTTR, mean time to recovery). For example, a service that fails once every twenty minutes and takes one minute to recover can be described as having availability of ninety-five percent.

While availability metrics are useful, these metrics do not address the quality-of-service (QOS) from a user's perspective. A user is interested only in the response time, or wait time, between when a transaction is initiated and when the transaction is completed. For example, a user ordering a product over the Internet might click on a shopping cart to complete the transaction and then wait for the transaction to complete. Empirical evidence suggests that a typical user expects a response within about twelve seconds. A longer wait for a response may cause the user to abandon that site and use a competitor's site.

Although there are tools that may measure and log these QOS variables as a function of time, there are no tools that permit the diagnosis of interaction effects between and among the various QOS variables. A system analyst may be interested in the answers to questions such as: (1) If I have 10,000 email users this month, and I add 2,000 new email accounts next month, how will the email traffic impact my database users' wait times? (2) What impact do 8,000 animated browser banners have on download latency times for my 3,000 active file transfer protocol (FTP) users—and vice versa? (3) What impact do 4,000 active portable document format (PDF) file viewers have on transaction processing system (TPS) throughput? In general, what impact does the instantaneous demand for performance variable X produce in performance variable Y?

Attempting to measure the impact that one variable has on another variable is difficult, at best. One way of attempting to measure this interaction is to create a step increase in the number of transactions of one category and search for a change in the response, or wait, time in transactions of another category. The ability to find a change in the wait time in a second category of transaction requires the step increase in the first category of transaction to be relatively large. However, using a large step increase is undesirable because the large step increase may adversely affect the response time in the first variable also. Additionally, if the step increase is too large, the increase can cause the system to fail, or "crash."

What is needed is a method and an apparatus to quantify the interaction of QOS variables as described above while minimizing the impact on the response times of the system.

SUMMARY

One embodiment of the present invention provides a system that facilitates measuring quality-of-service of a computer network server or collection of servers by determining the effect that transactions in one category of service have on transactions in other categories of service. The system operates by generating a varying pattern of synthetic transactions for one category of service and a fixed pattern of synthetic transactions for the other categories of service at a synthetic transaction generator. The system sends the varying pattern and the fixed pattern of synthetic transactions and receives responses to these patterns across a network or a direct coupling to the computer network server or collection of servers. The system then measures the response time for the varying pattern of synthetic transactions and the response time for the fixed pattern of synthetic transactions. Additionally, the system calculates the effect of transactions in one category of service on response times in the other category of service.

In one embodiment of the present invention, the system creates a table, indexed by time-of-measurement, of the response times for the categories of service.

In one embodiment of the present invention, the table includes a sliding-window of response times that includes the superposition of multiple systematically varying patterns of synthetic transactions.

In one embodiment of the present invention, the system calculates the effect of one category of service on the other categories of service by performing a bivariate statistical analysis on the table.

In one embodiment of the present invention, the bivariate statistical analysis includes a bivariate normalized cross power spectral density computation between the first response time and the second response time.

In one embodiment of the present invention, the result of the bivariate normalized cross power spectral density computation is analyzed using a Kolmogorov-Smirnov test of whiteness to determine dependencies between the first category of service and the second category of service.

In one embodiment of the present invention, the system creates multiple synthetic transaction generators at sites that are geographically separated from each other and geographically separated from the computer network server or collection of servers so that quality-of-service can be measured from widely separated sites.

In one embodiment of the present invention, the varying pattern of synthetic transactions includes a sinusoidally varying pattern of synthetic transactions.

In one embodiment of the present invention, the categories of service includes, but is not limited to, file transfers, database queries, email transactions, browser advertising banners, office applications, PDF file viewers, calendar updates, code executions, and file compressions.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Network Server Coupled to Synthetic Transaction Generators

Figure 1:
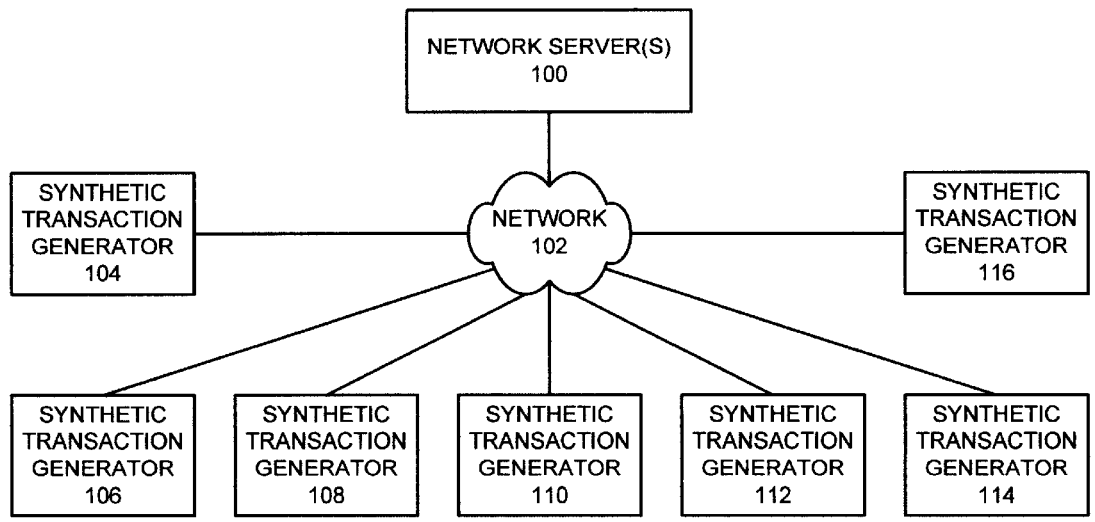
FIG. 1 illustrates synthetic transaction generators coupled to network server(s) 100 in accordance with an embodiment of the present invention.

FIG. 1 illustrates synthetic transaction generators coupled to network server(s) 100 in accordance with an embodiment of the present invention. Synthetic transaction generators 104, 106, 108, 110, 112, 114, and 116 are typically positioned at sites that are geographically separated from network server(s) 100 and from each other. Synthetic transaction generators 104, 106, 108, 110, 112, 114, and 116 are coupled to network server(s) 100 by network 102. Note that it will be readily apparent to a practitioner with ordinary skill in the art that any number of synthetic transaction generators can be used, depending upon system requirements.

Network server(s) 100 and synthetic transaction generators 104, 106, 108, 110, 112, 114, and 116 can generally include any type of computer system, including, but not limited to, a computer system based on a microprocessor, a mainframe computer, a digital signal processor, a portable computing device, a personal organizer, a device controller, and a computational engine within an appliance.

Network 102 can generally include any type of wire or wireless communication channel capable of coupling together computing nodes. This includes, but is not limited to, a local area network, a wide area network, or a combination of networks. In one embodiment of the present invention, network 102 includes the Internet.

In operation, synthetic transaction generators 104, 106, 108, 110, 112, 114, and 116 generate synthetic transactions (i.e. machine-initiated transactions vs. those initiated by human users) for network server(s) 100. These transactions are sent to network server(s) 100 across network 102 and are processed up to the point where the transaction would be executed. The transaction is then cancelled, saving only the response time for the transaction to be processed.

Synthetic transaction generators 104, 106, 108, 110, 112, 114, and 116 generate synthetic transactions for the categories of services that are available on network server(s) 100. These synthetic transactions can include, but are not limited to, file transfers, database queries, email transactions, browser advertising banners, office applications, Pdf file viewers, calendar updates, code executions, and file compressions.

The synthetic transaction generators place small, typically sinusoidal, variations in the number of transactions for one category of service while holding the number of transactions in the other categories of service constant. The response times for the synthetic transactions are stored in a table, which is subsequently analyzed with mathematic techniques to determine the effects on response times in the other categories of service caused by the variations in the number of transactions in the category of service being varied. It should be noted that the number of synthetic transactions should be low—an order of magnitude or more lower—compared to the number of real transactions being handled by network server(s) 100 in order to prevent the synthetic transactions from affecting the outcome. In addition, the period of the sinusoid that is varying the synthetic transactions can be very long, typically measured in hours.

Synthetic Transaction Generator

Figure 2:
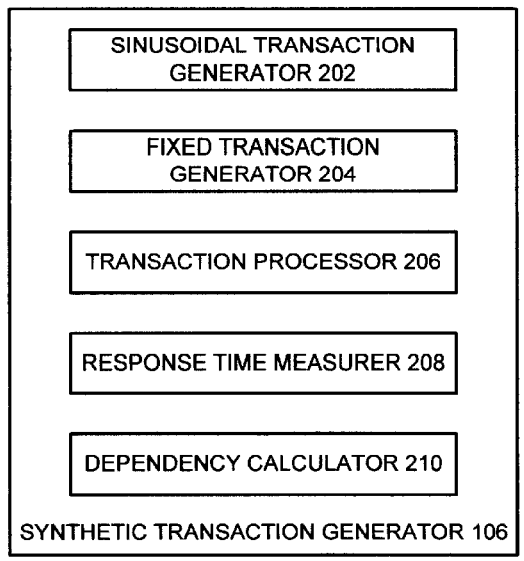
FIG. 2 illustrates synthetic transaction generator 106 in accordance with an embodiment of the present invention.

FIG. 2 illustrates synthetic transaction generator 106 in accordance with an embodiment of the present invention. Synthetic transaction generators 104, 106, 108, 110, 112, 114, and 116 from FIG. 1 are similar, so only synthetic transaction generator 106 will be discussed herein. Synthetic transaction generator 106 includes sinusoidal transaction generator 202, fixed transaction generator 204, transaction processor 206, response time measurer 208, and dependency calculator 210.

Sinusoidal transaction generator 202 generates synthetic transactions to be applied to network server(s) 100 across network 102. The number of synthetic transactions varies sinusoidally. These transactions are applied to one category of service as discussed above in conjunction with FIG. 1. Note that the category of service being varied by sinusoidal transaction generator 202 is typically cycled, individually over time, through all of the services being supplied by network server(s) 100 so that each category of service can be analyzed.

Fixed transaction generator 204 provides a fixed number of transactions over time for the other categories of services being provided by network server(s) 100. These fixed rate transactions provide response time measurements for the categories of service other than the category being controlled. The system uses these response times to calculate dependencies between the category of service being controlled and the other categories of service as described below in conjunction with FIG. 4.

Transaction processor 206 accepts the synthetic transactions from sinusoidal transaction generator 202 and fixed transaction generator 204 and processes these transactions by applying these transactions to network server(s) 100 across network 102. Transaction processor 206 processes each transaction up to the point where network server(s) 100 is ready to complete the transaction. At this point, the transaction is cancelled.

Response time measurer 208 operates in conjunction with transaction processor 206 to determine the response time—or wait time—associated with the synthetic transaction. Response time measurer 208 saves all of the response times in a table for processing by dependency calculator 210.

Dependency calculator 210 calculates the dependencies between the response time for each service category and the sinusoid impressed on the controlled service category as described below in conjunction with FIG. 4.

Measuring Transaction Response Times

Figure 3:
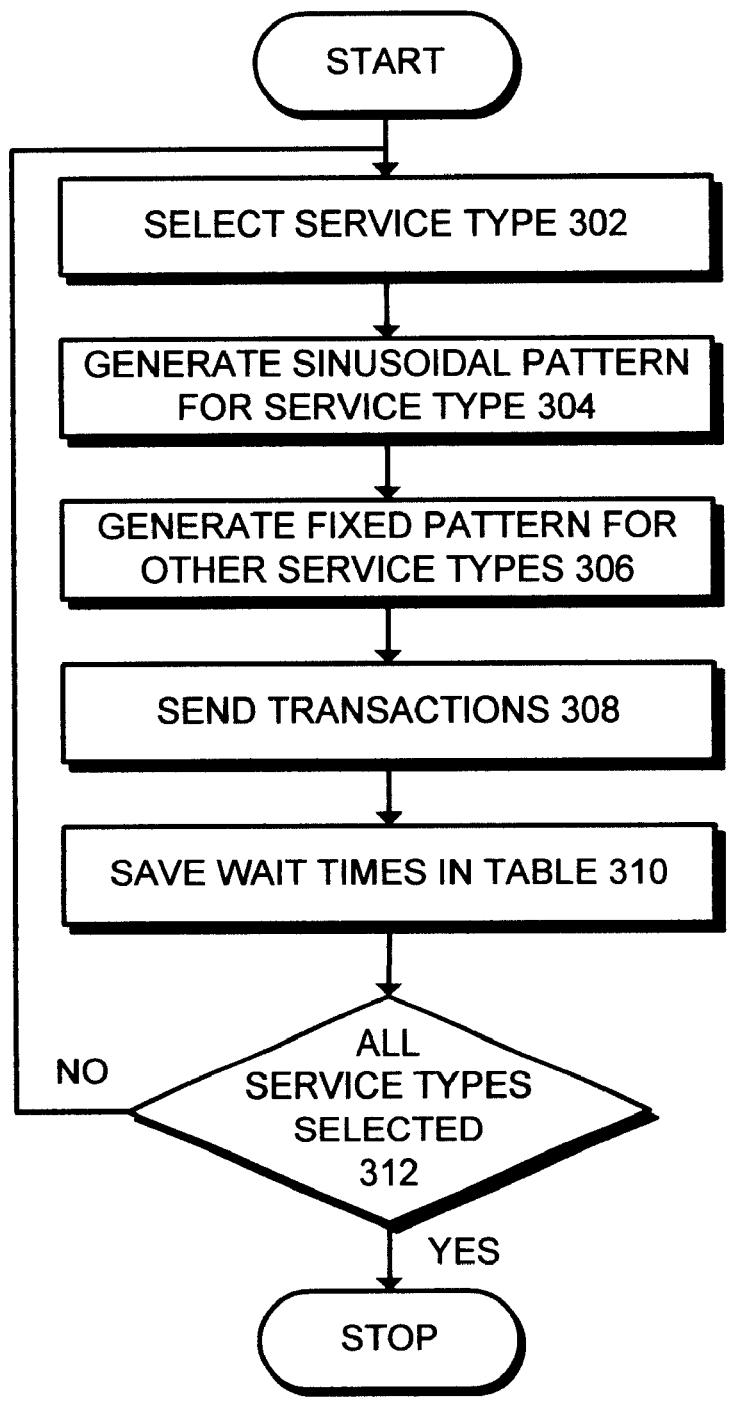
FIG. 3 is a flowchart illustrating the process of generating synthetic transactions and measuring response times in accordance with an embodiment of the present invention.

FIG. 3 is a flowchart illustrating the process of generating synthetic transactions and measuring response times in accordance with an embodiment of the present invention. The system starts when a synthetic transaction generator, say synthetic transaction generator 106, selects a service category to be controlled (step 302). Sinusoidal transaction generator 202 then generates a sinusoidally varying pattern for this service category (step 304). Fixed transaction generator 204 generates a fixed pattern for all other service categories supplied by network server(s) 100 (step 306).

Next, transaction processor 206 applies these synthetic transactions to network server(s) 100 across network 102 (step 308). As described above in conjunction with FIG. 2, transaction processor 206 processes each transaction up to the point where network server(s) 100 is ready to complete the transaction. At this point, the transaction is cancelled. Note that the period of the sinusoid that is varying the synthetic transactions can be very long, typically measured in hours. Response time measurer 208 measures the response times for these transactions and stores the response times as wait times in a table (step 310). This table is indexed by time of transaction and contains the wait times for the various categories of service.

Finally, synthetic transaction generator 106 determines if all service categories have been selected to be varied by sinusoidal transaction generator 202 (step 312). If not, the process returns to 302 to select another service category, otherwise, the process is complete.

Determining Dependencies

Figure 4:
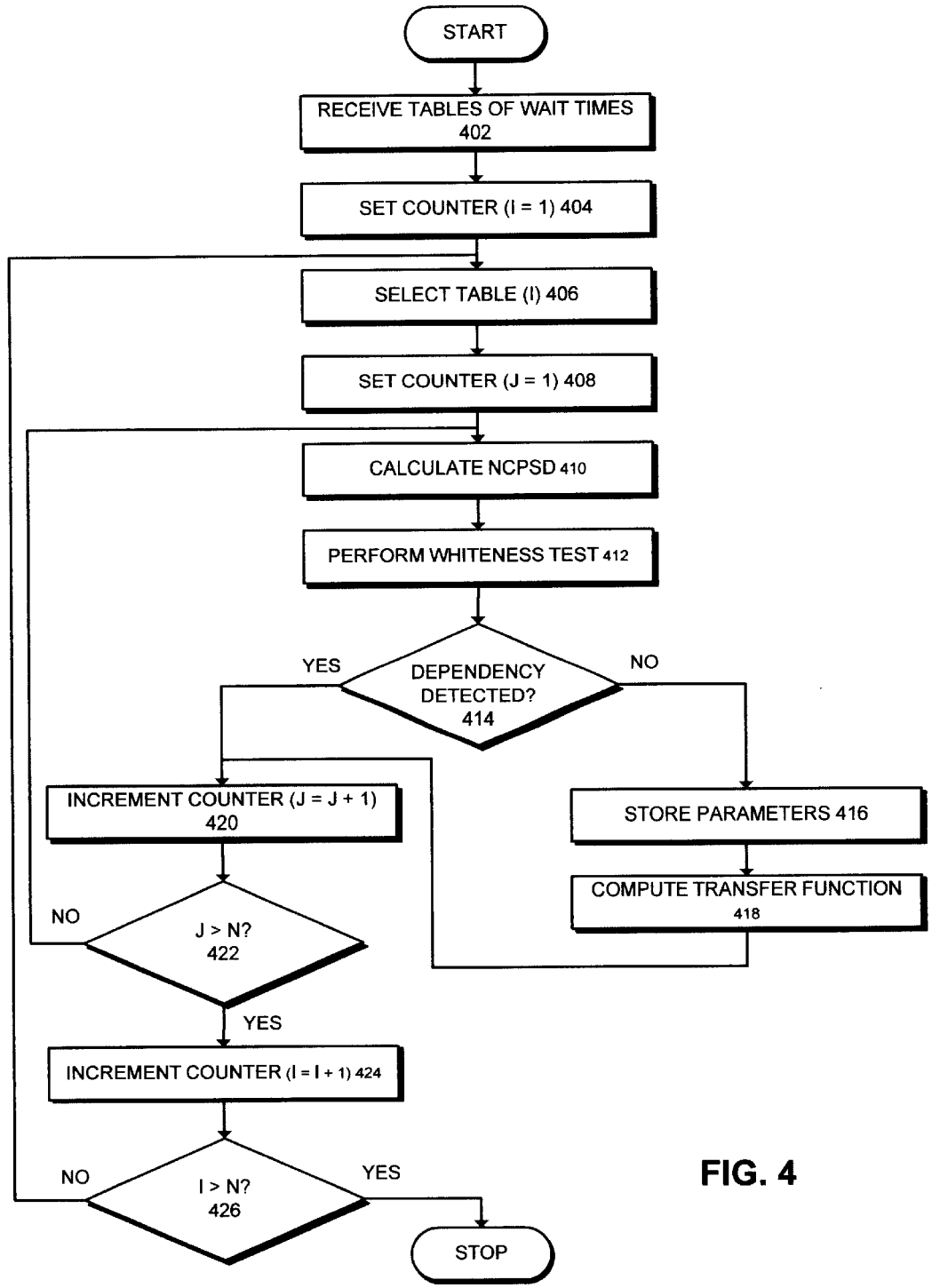
FIG. 4 is a flowchart illustrating the process of quantifying the effects of transactions of one category on transactions of other categories in accordance with an embodiment of the present invention.

FIG. 4 is a flowchart illustrating the process of quantifying the effects of transactions of one category on transactions of other categories in accordance with an embodiment of the present invention. The system starts when a dependency calculator, say dependency calculator 210 within synthetic transaction generator 106 receives tables of wait times from response time measurer 208 (step 402). Note that the transactions generated by the fixed transaction generator may occur at intervals that are not quite fixed intervals because it is difficult to get a particular action to occur at a precise time. To compensate for this difficulty, a Cubic Spline Interpolation may be used. Cubic Spline Interpolation is well known in the art and is an available function in MatLab™ (MatLab™ is a product of The MathWorks, Natick, Mass.). Next, dependency calculator 210 sets counter I to 1 (step 404). Note that this description uses two counters, I and J, to control the process. The counter I relates to the service category being controlled by sinusoidal transaction generator 202, while the counter J refers to all of the other categories of service offered by network server(s) 100. It will be obvious to a practitioner with ordinary skill in the art that mechanisms other than counters can be used to control this process.

Next, dependency calculator 210 selects the table associated with service category I (step 406). After selecting the table, dependency calculator 210 sets counter J to 1 to select a column from the table to analyze for dependency upon service category I (step 408). Dependency calculator 210 then performs a bivariate normalized cross power spectral density computation (NCPSD) on the pair of wait times (step 410). Details of the bivariate NCPSD computation are well known in the art and can be found in *Spectral Analysis and Its Applications* by Jenkins, G. M. and Watts, D. G. (1968, Holden-Day, San Francisco, Calif.).

After calculating the NCPSD, dependency calculator 210 performs a Kolmagrov-Smirnov test for whiteness to determine if a dependency exists (step 412). The Kolmagrov-Smirnov test is a standard frequency domain statistical test that is well known in the art and can be found in *An Introduction to Stochastic Processes*, $2^{nd}$ Ed. (1966, Cambridge University Press). Next, dependency calculator 210 determines if a dependency was detected by the Kolmagrov-Smirnov test (step 414).

If a dependency was detected, dependency calculator 210 stores the values of both counters I and J, and the value returned from the NCPSD (step 416). Next, dependency calculator 210 computes and stores the transfer function coefficients at the excitation frequency or frequencies used by sinusoidal transaction generator 202 to drive the service category (step 418). Note that these transfer function coefficients are the final output of the system and can be used by a system analyst to determine the effects that one service has on other categories of service supplied by network server(s) 100.

After computing the transfer functions at 418 or if no dependency was detected at 414, dependency calculator 210 increments counter J (STEP 420). Dependency calculator 210 then determines if counter J has been incremented past the last available service (step 422). If not, the process returns to 410 to calculate the next NCPSD.

If counter J has been incremented past the last available service, dependency calculator 210 increments counter I (step 424). After incrementing counter I, dependency calculator 210 determines if counter I has been incremented past the last service being tested for creating a dependency (step 426). If so the process is ended, otherwise the process returns to 406 to select the next table.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method to facilitate measuring quality-of-service of a computer network server, wherein measuring quality-of-service includes determining an effect that transactions in a first category of service have on transactions in a second category of service, the method comprising:

generating a varying pattern of synthetic transactions for the first category of service at a synthetic transaction generator;

generating a fixed pattern of synthetic transactions for the second category of service at the synthetic transaction generator;

sending the varying pattern and the fixed pattern of synthetic transactions across one of a network and a direct coupling to the computer network server;

receiving a response to the varying pattern and the fixed pattern of synthetic transactions from the computer network server;

measuring a first response time for the varying pattern of synthetic transactions and a second response time for the fixed pattern of synthetic transactions; and calculating the effect of transactions in the first category of service on response times in the second category of service.

2. The method of claim 1, further comprising creating a table of first response times for the first category of service and second response times for the second category of service, wherein the table is indexed by time-of-measurement.

3. The method of claim 2, wherein the table includes a sliding-window of first response times and second response times, and wherein the table includes multiple varying patterns of synthetic transactions.

4. The method of claim 2, wherein calculating the effect of the first category of service on the second category of service involves performing a bivariate statistical analysis using the respective response time variables as input.

5. The method of claim 4, wherein the bivariate statistical analysis includes a bivariate normalized cross power spectral density computation between the first response time and the second response time.

6. The method of claim 5, wherein a result of the bivariate normalized cross power spectral density computation is analyzed using a Kolmogorov-Smirnov test of whiteness to determine dependencies between the first category of service and the second category of service.

7. The method of claim 1, further comprising creating a plurality of synthetic transaction generators at sites that are geographically separated from each other and geographically separated from the computer network server, wherein quality-of-service can be measured from widely separated sites.

8. The method of claim 1, wherein the varying pattern of synthetic transactions includes a sinusoidally varying pattern of synthetic transactions.

9. The method of claim 1, wherein the first category of service includes one of, a file transfer, a database query, an email transmission, a browser banner, an office application, a file viewer, a calendar update, a code execution, and a file compression.

10. A computer-readable storage medium storing instructions that when executed by a computer cause the computer to perform a method to facilitate measuring quality-of-service of a computer network server, wherein measuring quality-of-service includes determining an effect that transactions in a first category of service have on transactions in a second category of service, the method comprising:

generating a varying pattern of synthetic transactions for the first category of service at a synthetic transaction generator;

generating a fixed pattern of synthetic transactions for the second category of service at the synthetic transaction generator;

sending the varying pattern and the fixed pattern of synthetic transactions across one of a network and a direct coupling to the computer network server;

receiving a response to the varying pattern and the fixed pattern of synthetic transactions from the computer network server;

measuring a first response time for the varying pattern of synthetic transactions and a second response time for the fixed pattern of synthetic transactions; and calculating the effect of transactions in the first category of service on response times in the second category of service.

11. The computer-readable storage medium of claim 10, the method further comprising creating a table of first response times for the first category of service and second response times for the second category of service, wherein the table is indexed by time-of-measurement.

12. The computer-readable storage medium of claim 11, wherein the table includes a sliding-window of first response times and second response times, and wherein the table includes multiple varying patterns of synthetic transactions.

13. The computer-readable storage medium of claim 11, wherein calculating the effect of the first category of service on the second category of service involves performing a bivariate statistical analysis on the table.

14. The computer-readable storage medium of claim 13, wherein the bivariate statistical analysis includes a bivariate normalized cross power spectral density computation between the first response time and the second response time.

15. The computer-readable storage medium of claim 14, wherein a result of the bivariate normalized cross power spectral density computation is analyzed using a Kolmogorov-Smirnov test of whiteness to determine dependencies between the first category of service and the second category of service.

16. The computer-readable storage medium of claim 10, the method further comprising creating a plurality of synthetic transaction generators at sites that are geographically separated from each other and geographically separated from the computer network server, wherein quality-of-service can be measured from widely separated sites.

17. The computer-readable storage medium of claim 10, wherein the varying pattern of synthetic transactions includes a sinusoidally varying pattern of synthetic transactions.

18. The computer-readable storage medium of claim 10, wherein the first category of service includes one of, a file transfer, a database query, an email transmission, a browser banner, an office application, a file viewer, a calendar update, a code execution, and a file compression.

19. An apparatus that facilitates measuring quality-of-service of a computer network server, wherein measuring quality-of-service includes determining an effect that transactions in a first category of service have on transactions in a second category of service, the apparatus comprising:

a synthetic transaction generator;

a generating mechanism configured to generate a varying pattern of synthetic transactions for the first category of service at the synthetic transaction generator;

wherein the generating mechanism is further configured to generate a fixed pattern of synthetic transactions for the second category of service at the synthetic transaction generator;

a sending mechanism configured to send the varying pattern and the fixed pattern of synthetic transactions across one of a network and a direct coupling to the computer network server;

a receiving mechanism configured to receive a response to the varying pattern and the fixed pattern of synthetic transactions from the computer network server;

a measuring mechanism that is configured to measure a first response time for the varying pattern of synthetic transactions and a second response time for the fixed pattern of synthetic transactions; and a calculating mechanism that is configured to calculate the effect of transactions in the first category of service on response times in the second category of service.

20. The apparatus of claim 19, further comprising a table-creation mechanism configured to create a table of first response times for the first category of service and second response times for the second category of service, wherein the table is indexed by time-of-measurement.

21. The apparatus of claim 20, wherein the table includes a sliding-window of first response times and second response times, and wherein the table includes multiple varying patterns of synthetic transactions.

22. The apparatus of claim 20, further comprising:
a calculating mechanism configured to calculate the effect of the first category of service on the second category of service; and
an analysis mechanism configured to perfor a bivariate statistical analysis on the table.

23. The apparatus of claim 22, wherein the bivariate statistical analysis includes a bivariate normalized cross power spectral density computation between the first response time and the second response time.

24. The apparatus of claim 23, wherein a result of the bivariate normalized cross power spectral density computation is analyzed using a testing mechanism configured to use a Kolmogorov-Smirnov test of whiteness to determine dependencies between the first category of service and the second category of service.

25. The apparatus of claim 19, wherein the creating mechanism is configured to create a plurality of synthetic transaction generators at sites that are geographically separated from each other and geographically separated from the computer network server, wherein quality-of-service can be measured from widely separated sites.

26. The apparatus of claim 19, wherein the varying pattern of synthetic transactions includes a sinusoidally varying pattern of synthetic transactions.

27. The apparatus of claim 19, wherein the first category of service includes one of, a file transfer, a database query, an email, a browser banner, an office application, a file viewer, a calendar update, a code execution, and a file compression.

* * * * *